US010649918B2

(12) United States Patent
Poornachandran et al.

(10) Patent No.: US 10,649,918 B2
(45) Date of Patent: May 12, 2020

(54) DYNAMIC RECONFIGURATION AND MANAGEMENT OF MEMORY USING FIELD PROGRAMMABLE GATE ARRAYS

(71) Applicant: INTEL CORPORATION, Santa Clara, CA (US)

(72) Inventors: Rajesh Poornachandran, Portland, OR (US); Vincent J. Zimmer, Issaquah, WA (US); Ned M. Smith, Beaverton, OR (US); Nadhiya Chandramohan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 208 days.

(21) Appl. No.: 15/718,640

(22) Filed: Sep. 28, 2017

(65) Prior Publication Data
US 2019/0095352 A1 Mar. 28, 2019

(51) Int. Cl.
*G06F 12/14* (2006.01)
*G06F 9/4401* (2018.01)
(Continued)

(52) U.S. Cl.
CPC ........ *G06F 12/1408* (2013.01); *G06F 9/4411* (2013.01); *G06F 9/4413* (2013.01);
(Continued)

(58) Field of Classification Search
CPC .... G06F 12/1408; G06F 9/4413; G06F 21/53; G06F 11/1068; G06F 12/0646;
(Continued)

(56) References Cited

U.S. PATENT DOCUMENTS

| 2002/0010875 A1* | 1/2002 | Johnson | G06F 11/108 |
| | | | 714/5.1 |
| 2008/0115006 A1* | 5/2008 | Smith | G06F 1/08 |
| | | | 713/601 |

(Continued)

OTHER PUBLICATIONS

U.S. Appl. No. 15/410,123, filed Jan. 19, 2017, Zimmer, "MRC Training in FPGA-In-Memory-Controller".

(Continued)

*Primary Examiner* — Thien Nguyen
(74) *Attorney, Agent, or Firm* — Finch & Maloney PLLC

(57) ABSTRACT

Techniques are provided for managing memory hot-add to a computing platform. A system implementing the techniques according to an embodiment includes a Field Programmable Gate Array (FPGA) memory controller (FMC) including a Memory Reference Code (MRC) Register Transfer Level (RTL) module to perform training of a memory module in response to receiving a memory hot-add event notification associated with the memory module. The MRC training includes memory timing adjustment based on configuration policies. The system also includes a management controller circuit to communicate with a remote administration server over a secure out-of-band network channel. The communication includes the configuration policies to be applied by the FMC circuit to the memory module. The FMC circuit further includes an analytics RTL module to perform bandwidth analysis and traffic prioritization, an encryption RTL module to perform encryption, and an error correction code (ECC) RTL module in conjunction with the configuration policies.

25 Claims, 11 Drawing Sheets

(51) Int. Cl.

| | |
|---|---|
| *G06F 9/455* | (2018.01) |
| *G06F 21/57* | (2013.01) |
| *G06F 12/06* | (2006.01) |
| *G06F 11/10* | (2006.01) |
| *G11C 29/52* | (2006.01) |
| *G06F 21/53* | (2013.01) |
| *G06N 20/00* | (2019.01) |
| *G11C 29/02* | (2006.01) |

(52) U.S. Cl.
CPC ...... *G06F 9/45558* (2013.01); *G06F 11/1048* (2013.01); *G06F 11/1068* (2013.01); *G06F 12/0646* (2013.01); *G06F 21/53* (2013.01); *G06F 21/572* (2013.01); *G06N 20/00* (2019.01); *G11C 29/52* (2013.01); *G06F 2009/45579* (2013.01); *G06F 2009/45583* (2013.01); *G06F 2009/45587* (2013.01); *G06F 2221/2149* (2013.01); *G11C 29/022* (2013.01); *G11C 29/023* (2013.01); *G11C 29/028* (2013.01)

(58) Field of Classification Search
CPC .. G06F 21/572; G06F 9/4411; G06F 9/45558; G06F 2009/45579; G06F 2009/45587; G06F 2009/45583; G06F 2221/2149; G06N 20/00; G11C 29/52; G11C 29/028; G11C 29/023; G11C 29/022
See application file for complete search history.

(56) References Cited

U.S. PATENT DOCUMENTS

| | | | |
|---|---|---|---|
| 2014/0013095 A1* | 1/2014 | Zimmer | G06F 21/14 713/2 |
| 2015/0095633 A1* | 4/2015 | Yao | G06F 21/575 713/2 |
| 2017/0286679 A1* | 10/2017 | Khare | G06F 3/0607 |
| 2018/0203816 A1* | 7/2018 | Cho | G06F 13/28 |

OTHER PUBLICATIONS

U.S. Appl. No. 15/476,693, filed Mar. 31, 2017, Zimmer, "Security Monitoring Agent for Field Programmable Gate Array (FPGA) In-Memory Controller".

* cited by examiner

DYNAMIC RECONFIGURATION AND MANAGEMENT OF MEMORY USING FIELD PROGRAMMABLE GATE ARRAYS

BACKGROUND

Computer systems generally execute initialization software during the power-on or boot-up process. This initialization software, which is often stored as firmware, is sometimes referred to as the Basic Input/Output System (BIOS), Extensible Firmware Interface (EFI), or Unified Extensible Firmware Interface (UEFI). The BIOS typically configures the memory controller, creates a memory map, and launches the operating system (OS), among other things. Additionally, some computer systems provide the capability for memory hot-add. That is to say, memory modules may be added to the computer while it is powered on and running. These additional memory modules are initialized and configured prior to use by the OS or other entities, using code similar to that used by the BIOS at power up.

The hot-add initialization, however, is typically performed by software or firmware running in a highly privileged/protected state, for example System Management Mode (SMM), during which other processing, including the OS, is suspended. Because execution in SMM is disruptive to the system, as it involves CPU cycle stealing, the hot-add memory module initialization and configuration is scheduled to be performed in relatively short and infrequent time slices, for example less than 100 microseconds out of every second. As such, the hot-add initialization and configuration can take hours, or sometimes days, to complete.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts.

Figure 1:
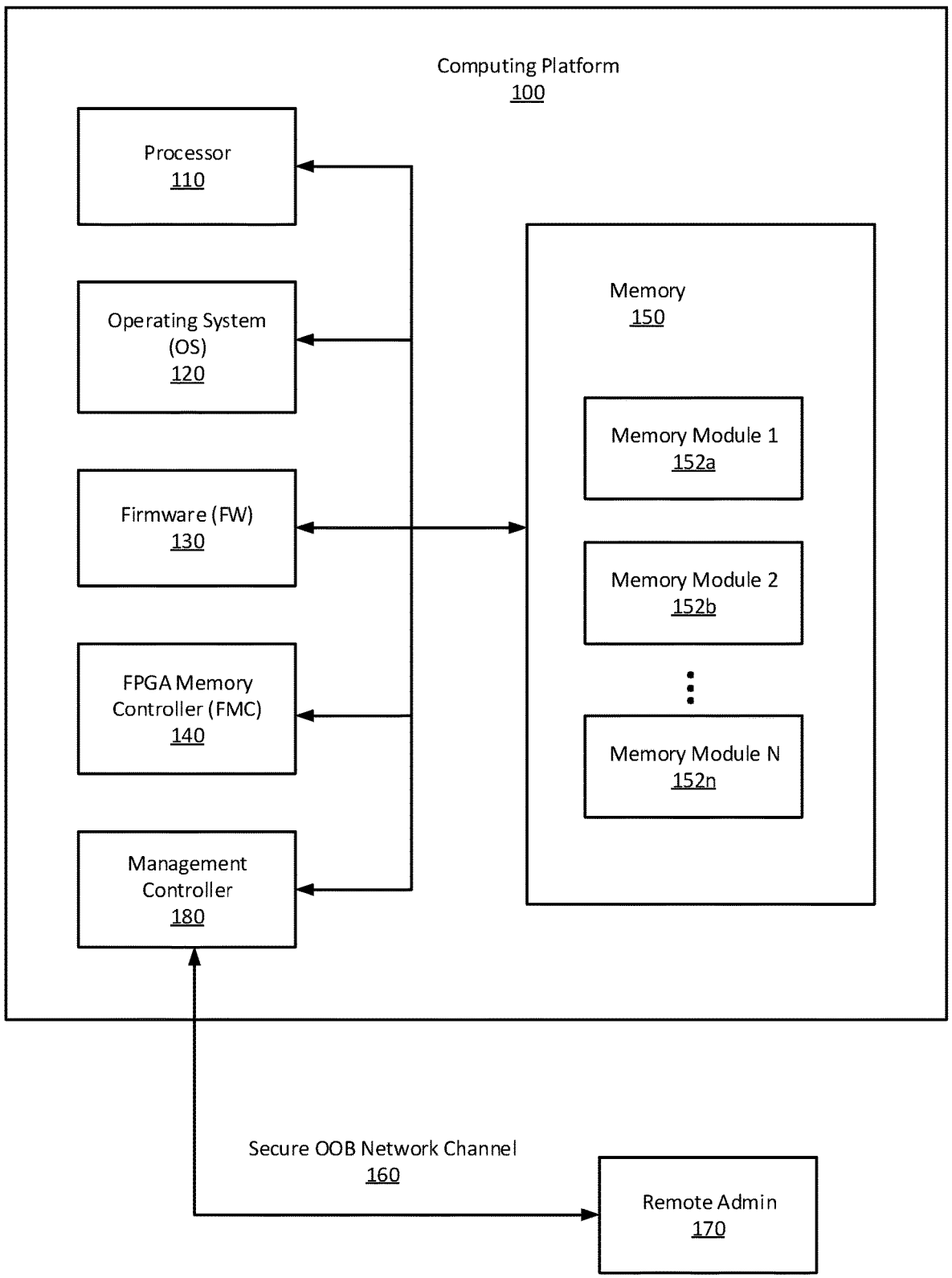
FIG. 1 is a top-level block diagram of an implementation of an FPGA memory controller on a computing platform, configured in accordance with certain embodiments of the present disclosure.

Although the following Detailed Description will proceed with reference being made to illustrative embodiments, many alternatives, modifications, and variations thereof will be apparent in light of this disclosure.

DETAILED DESCRIPTION

Generally, this disclosure provides techniques for reconfiguration and management of computer system memory using Field Programmable Gate Arrays (FPGAs), including initialization and configuration of hot-add or hot-swap memory modules. The use of an FPGA for memory management can reduce or eliminate the need for processor interrupts to highly privileged states which can significantly disrupt the operating system (OS) and virtual machine manager (VMM) and adversely affect system performance, reliability, and availability. For example, it is sometimes useful to expand the performance capability of a computer system through the addition or replacement of memory, without impacting the availability of that computer system by requiring the computer to be powered down during the procedure. This type of system upgrade is referred to as a memory hot-add or hot-swap, in which a memory module is added or replaced while the computer remains powered on and running. The disclosed techniques provide for initialization and configuration of the newly added memory using an FPGA, rather than one of the computer system's processors, to avoid execution of software in a highly privileged state (such as System Management Mode or SMM, or in connection with such a state) during which other processing, including the OS, is suspended.

The disclosed techniques can be implemented, for example, in a computing system or a software product executable or otherwise controllable by such systems, although other embodiments will be apparent. The system or product is configured to provide reconfiguration and management of memory modules using an FPGA. In accordance with an embodiment, a system to implement these techniques includes an FPGA memory controller circuit (FMC circuit) comprising one or more Register Transfer Level (RTL) modules configured to perform training, encryption, error coding, and/or analysis functions, as will be described in greater detail below. In some embodiments, these functions may be performed in response to receiving a memory hot-add event notification associated with the memory module. The performance of these functions may be based on provisioned configuration policies. The system further includes a management controller circuit configured to communicate with a remote administration server over a secure out-of-band network channel. Such communication may include the configuration policies to be applied by the FMC circuit to the memory module.

As will be appreciated, the techniques described herein may allow for improved system performance during initialization and configuration of hot-add memory modules, compared to existing methods that rely on execution of software or firmware in highly privileged execution modes (e.g., SMM) that require suspension of most other processing activities. Because execution in SMM is disruptive to the system, as it involves CPU cycle stealing, such existing methods for hot-add memory module initialization and configuration are generally scheduled to execute in relatively short and infrequent time slices, for example less than 100 microseconds out of every second, resulting in a process that can take hours, or sometimes days, to complete. In contrast, the FPGA can perform privileged operations at unrestricted speed without the requirement that the system be in a special mode that is burdened with this performance penalty. In some embodiments, an OS driver or SMM-mode software may initiate the process, however the major portion of the task is performed by the FPGA. The disclosed techniques can be implemented on a broad range of platforms including server systems, workstations, personal computers, laptops, tablets, and smart phones. These techniques may further be implemented in a combination of hardware and software.

FIG. 1 is a top-level block diagram of an implementation of an FPGA memory controller 140 on a computing platform 100, configured in accordance with certain embodiments of the present disclosure. The computing platform 100 is shown to include one or more processors 110, an Operating System (OS) 120, firmware (FW) 130, an FPGA memory controller circuit (FMC circuit), and management controller 180, the operations of which will be explained in greater detail below. Also shown is memory 150, which may include one or more memory modules 152a, 152b, . . . 152n, some of which may be added or replaced during hot-add operations. In some embodiments, these memory modules may be configured, for example, as dual in-line memory modules (DIMMs) or as other suitable memory circuit packaging. A remote administration server 170 is also shown, which is communicatively coupled to the management controller 180 over a secure out-of-band (OOB) network channel that is dedicated to this task and separate from other conventional communication channels that may be used by the computing platform. The management controller circuit 180 is configured to communicate with the remote administration server 170 to share configuration policies some of which are to be applied by the FMC circuit 140 to the memory modules 150, as will also be explained in greater detail below. In some embodiments, configuration policies may include one or more of boot prevention policies, alert generation policies, geo-fencing (security) policies, threat models, optimization for hot-add versus host access, and other platform configuration policies.

Figure 2:
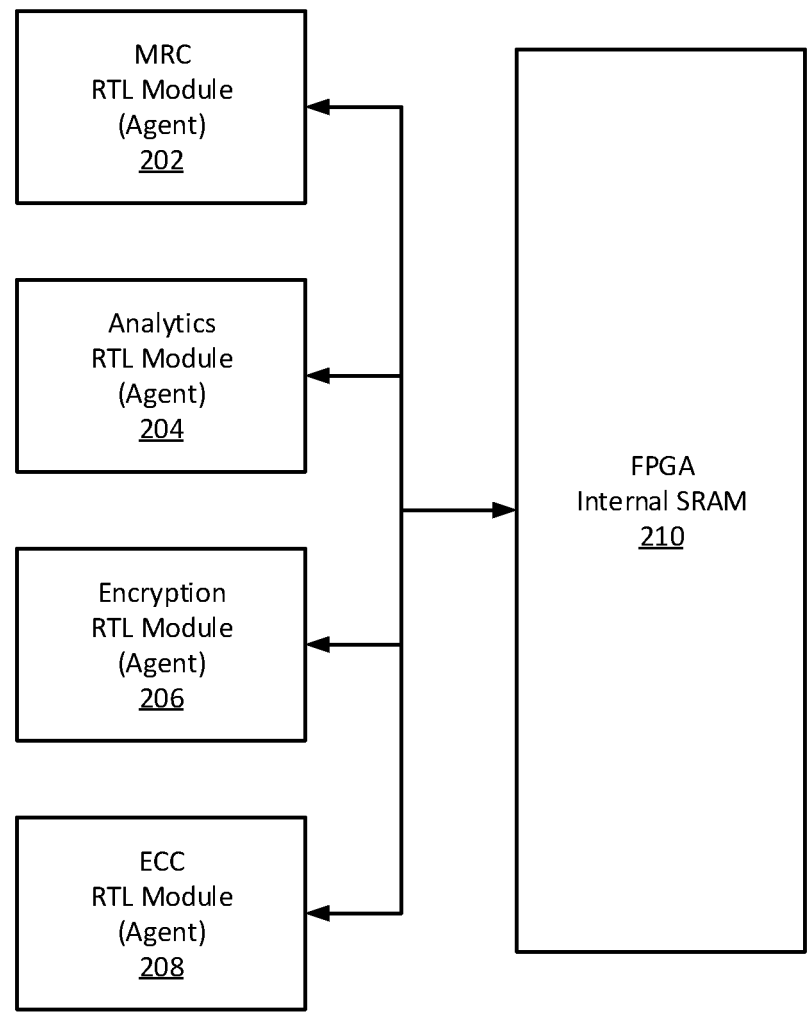
FIG. 2 is a more detailed block diagram of the FPGA memory controller, configured in accordance with certain embodiments of the present disclosure.

FIG. 2 is a more detailed block diagram of the FPGA memory controller 140, configured in accordance with certain embodiments of the present disclosure. The FMC 140 is shown to include a number of RTL modules 202, 204, 206, and 208 (sometimes referred to as agents), comprising programmable/re-programmable logic to perform selected functions. An FPGA internal SRAM 210 is also shown, which is configured to store and provide the programmable logic that configures the RTL modules.

The Memory Reference Code (MRC) RTL module 202 is configured to perform training of a memory module in response to receiving a memory hot-add event notification associated with that memory module. The MRC training includes adjustment of memory read timing and write timing based on the current configuration policies.

The analytics RTL module 204 is configured to perform bandwidth analysis and traffic prioritization associated with the memory modules to determine adjustments to the clocking speed of the MRC training. The results of the analytics RTL module may also be communicated or uploaded to the remote administration server 170, for use in further updating of the configuration policies. In some embodiments, the remote administration server 170 may be configured to update or fine-tune the RTL modules based on the analytics results collected from one or more platforms, to improve efficiency, security, and performance of the RTL modules, which may subsequently be re-downloaded to the platforms.

The encryption RTL module 206 is configured to perform encryption of regions of memory on the memory module using selected encryption processes based on the configuration policies including, for example, geo-fencing, threat models, and client-specific encryption requirements.

In some embodiments, memory encryption policies may be flexibly applied to optimize performance versus security where, for example: (1) swappable OS heap or core memory is moved from CPU cache to a discrete memory module; (2) selected layers of cache memory hierarchy are implemented using off-CPU memory; or (3) data in FLASH memory, or other persistent memory, may be exposed to offline attacks by an actor that has physical access to the system (for example a stolen laptop). A geo-fence policy might require more extensive application of memory encryption (e.g., automatic encryption of all memory, as opposed to just swap memory) when a user travels to a foreign country.

The error correction code (ECC) RTL module 208 is configured to perform error correction on the memory module using selected ECC processes based on the configuration policies. This process may include, for example, zeroing of the memory to set syndrome bits for error correction coding.

Although four RTL modules are shown in FIG. 2, the present disclosure is not intended to be so limited, and additional RTL modules may be employed as desired. For example, in some embodiments, the FMC may further include a "row hammer" mitigation RTL module configured to monitor memory access patterns and route memory accesses in a manner to mitigate "row hammer" attacks.

The FMC 140 is further configured to expose the trained and configured memory to host entities of the platform, for example through platform FMC driver software. The host entities may include one or more of a virtual machine manager (VMM), a host operating system (OS), and a guest OS.

As previously mentioned, the management controller circuit 180 is configured to communicate with the remote administration server 170, over a secure OOB network channel, to share configuration policies to be applied to the memory modules 150 by the RTL modules of the FMC circuit 140. The communication may also include downloads (and patch updates) of the RTL modules, sometimes called FPGA applets, from the remote administration server. Such capability allows for dynamic customization of the memory management system without requiring a reboot, which is important for high availability server systems. As described previously, the remote administration server may be configured to update or fine-tune the RTL modules based on the analytics results collected from one or more platforms (e.g., in a crowd-sourcing manner), to improve efficiency, security, and performance of the RTL modules.

In some embodiments, a number of security policy mechanisms or processes may be employed to improve the security of any RTL module updates. For example, to prevent a possible attack from malware that has compromised an OS, RTL module updates may be performed only while the processor is executing in SMM. As another example, if SMM is not trusted, then RTL module updates may be restricted to being performed under the control of the management controller circuit 180. As yet another example, if the management controller circuit 180 is not trusted, then the RTL module updates may be restricted to being performed during a trusted BIOS boot mode.

Additionally, the management controller circuit 180 may further be configured to perform remote attestation with the remote administration server using provisioned credentials, as will be described below.

Figure 3:
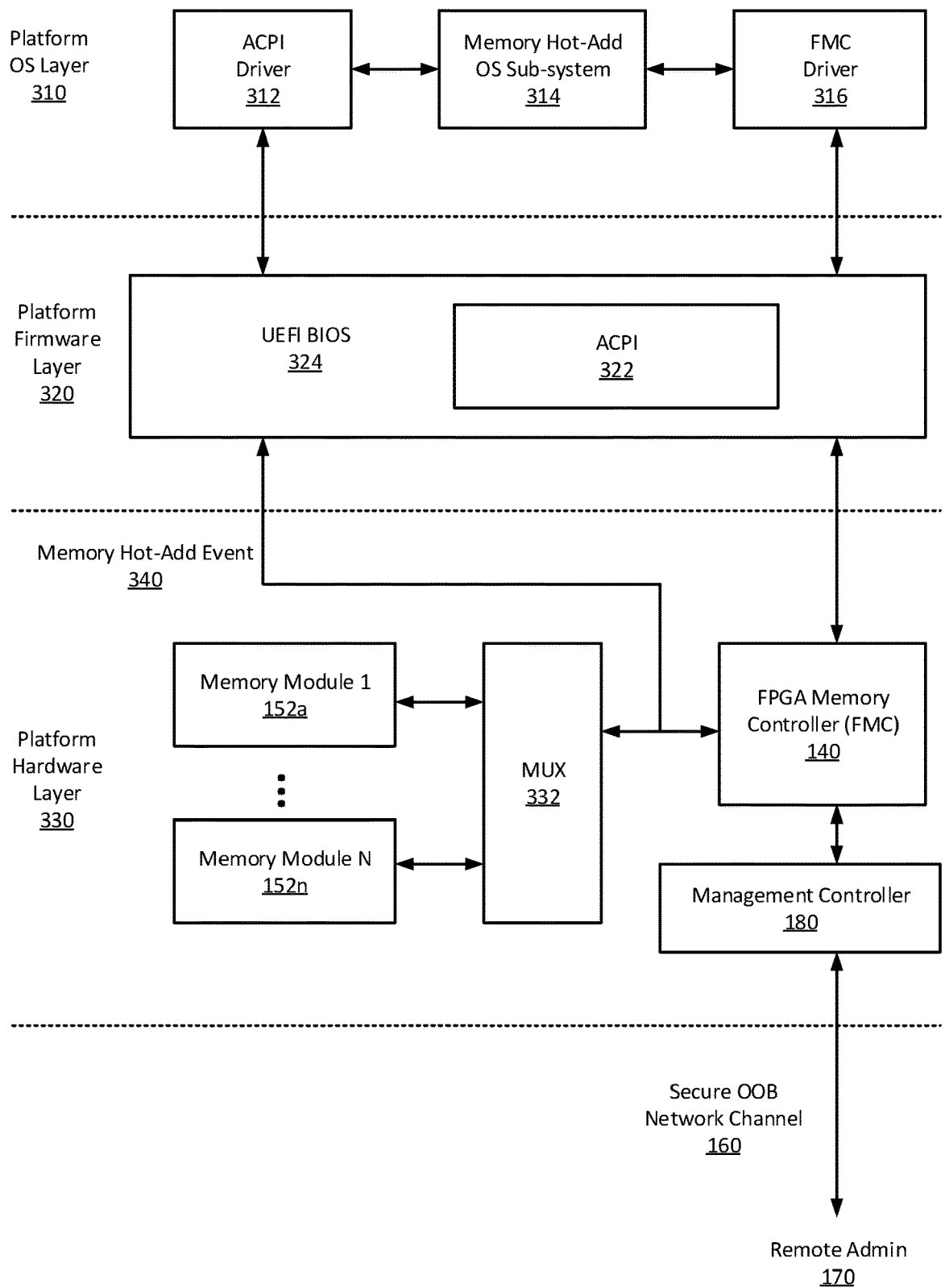
FIG. 3 is a block diagram illustrating operating system, firmware, and hardware layers of the computing platform, configured in accordance with certain embodiments of the present disclosure.

FIG. 3 is a block diagram 300 illustrating operating system, firmware, and hardware layers of the computing platform, configured in accordance with certain embodiments of the present disclosure. The platform OS layer 310 is shown to include an advanced configuration and power interface (ACPI) driver 312, memory hot-add OS sub-system 314, and FMC driver 316. The platform firmware layer 320 is shown to include the UEFI BIOS 324 and ACPI 322. The platform hardware layer 330 is shown to include the memory modules 152, the FMC 140, the management controller 180, and a multiplexer circuit 332 configured to provide a multiplexed interface between the FMC and the multiple memory modules 152 such that a desired memory module may be selected.

The ACPI driver 312 and the FMC driver 316 are configured to provide a software interface to the ACPI 322 and FMC 140, respectively. In some embodiments, these drivers provide function entry points or access methods through which desired functionality of the ACPI and FMC are exposed to the OS. The UEFI BIOS 324 includes ACPI firmware, tables, and registers, configured to provide a standardized interface through which the OS, via the ACPI driver, can discover, configure and monitor the status of hardware components on the computer system or platform.

In some embodiments, in response to the detection of a memory hot-add event 340 by the ACPI 322, a notification is delivered to the FMC driver 316. This notification may be generated by a suitable combination of the ACPI driver 312 the memory hot-add sub-system 314 of the OS. The FMC driver then generates an MRC training request to the FMC 140, to be delivered through the UEFI BIOS 324. In response to this request, the MRC RTL module 202 initiates training for the newly added memory module, as will be described below, and alerts the FMC driver upon completion, for example through a processor interrupt or other suitable mechanism. The FMC driver can then query the MRC RTL module for additional information (e.g., success/failure, diagnostics, etc.) as needed.

Upon successful completion of training and verification of the hot-add memory module, the FMC driver 316 invokes the UEFI BIOS firmware (e.g., using an ACPI method or equivalent mechanism) to cause the FMC RTL modules to complete additional implementation specific operations, such as, for example, updating the memory map, performing ECC, and performing encryption. The FMC 140 may also be configured to prioritize bus traffic to the memory modules, for example favoring memory initialization over normal memory access patterns, or vice versa, depending on configuration policies.

Figure 4:
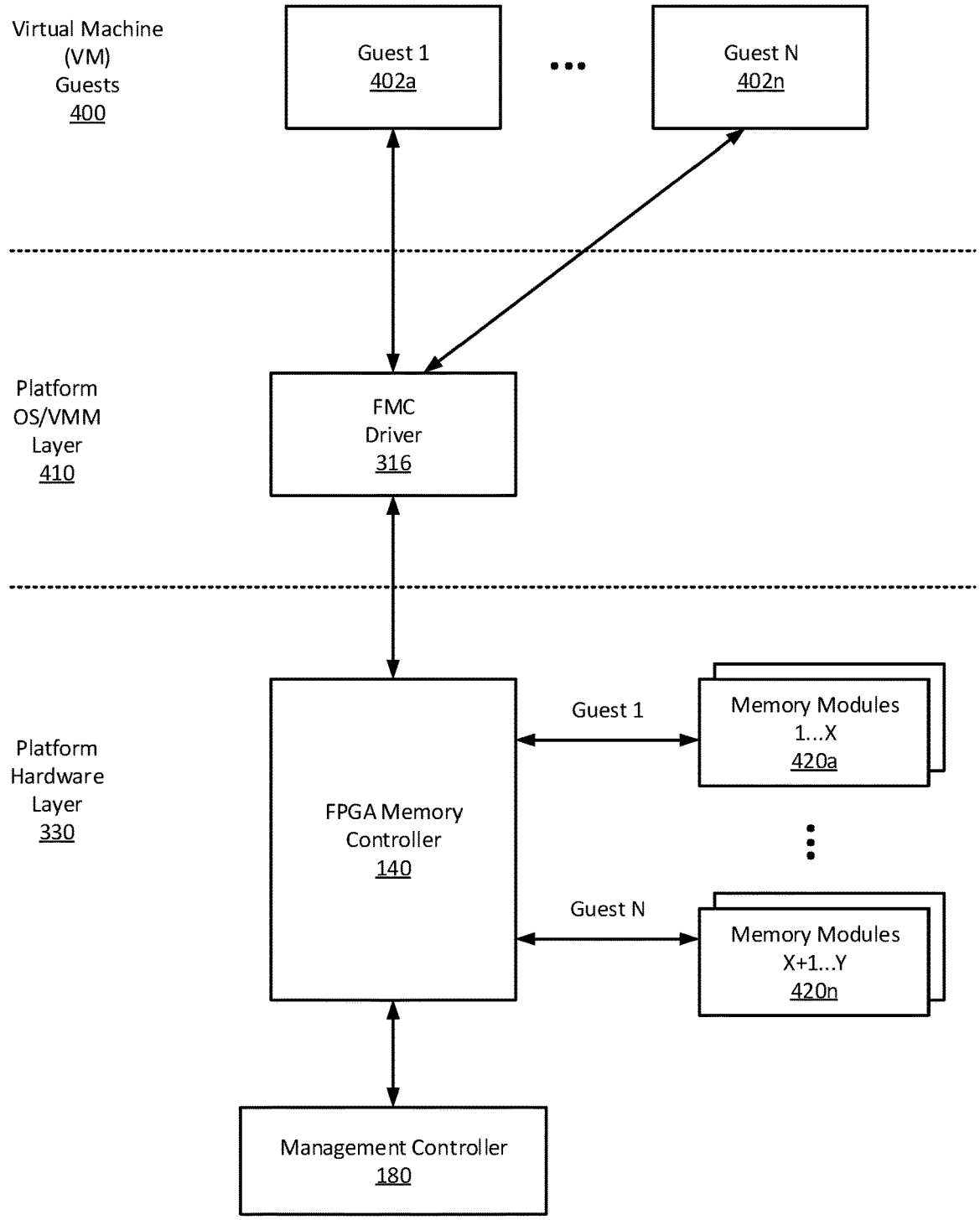
FIG. 4 is a block diagram illustrating operations of the FPGA memory controller, in accordance with certain embodiments of the present disclosure.

FIG. 4 is a block diagram 400 illustrating operation of the FPGA memory controller, in accordance with certain embodiments of the present disclosure. The FMC driver 316 is shown as a software module that executes as part of the platform OS/VMM, for example in kernel mode (a privileged/protected mode, but not as disruptive to system operation as SMM). The FMC driver 316 is configured to facilitate communication between host software and the FMC RTL modules. The FMC driver is further configured to expose initialized and configured memory regions to the OS, VMM and Guest OSs, on an as needed basis. So, for example, regions of memory modules 1 through X (420a) may be exposed to VM guest 1 (402a), and other regions of memory modules X+1 through Y (420n) may be exposed to VM guest N (402n). In other example embodiments, there may be overlaps between the memory regions that are exposed to different VM guests.

Figure 5:
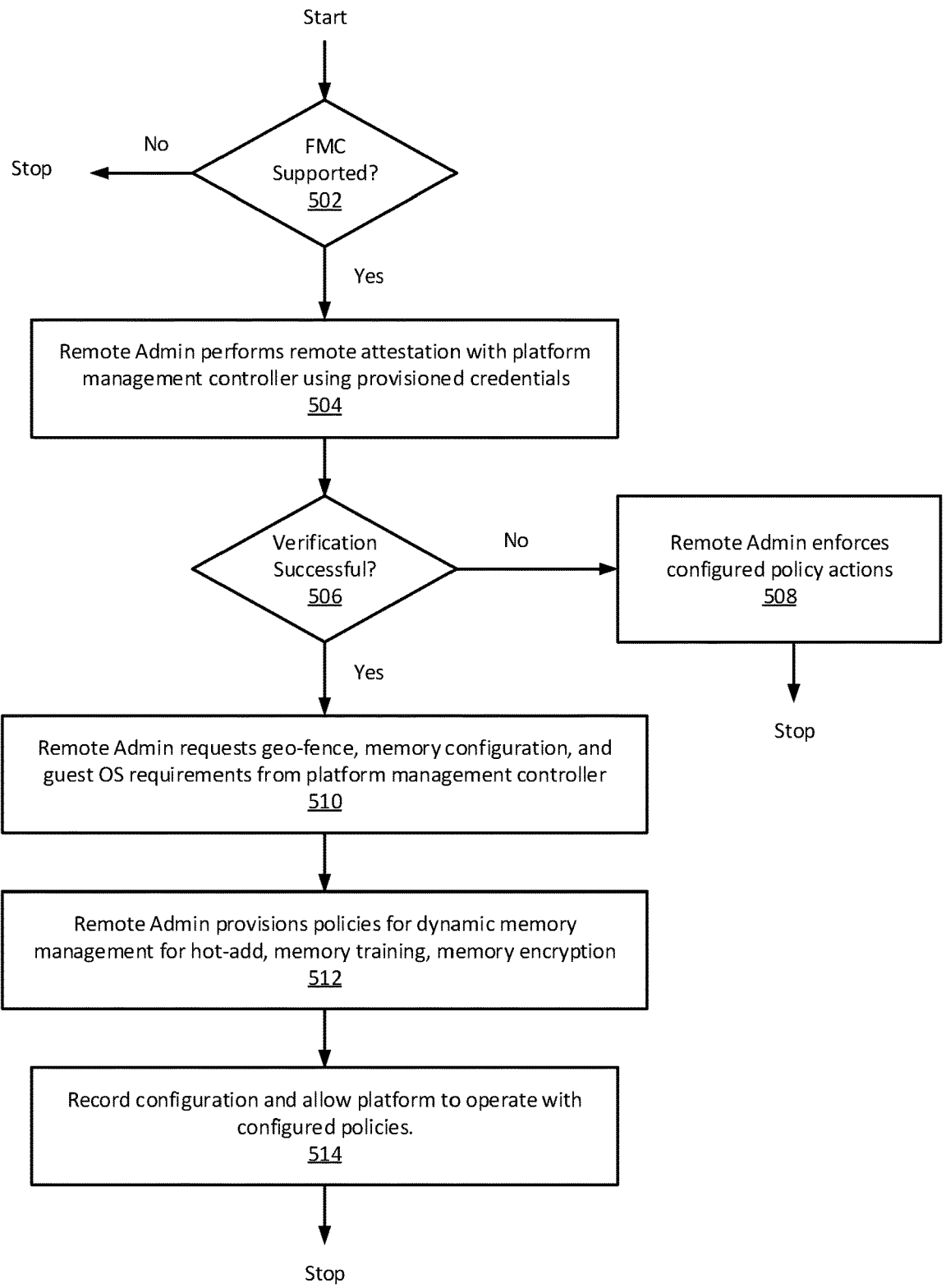
FIG. 5 is a flowchart illustrating a methodology for remote attestation over a secure out-of-band network channel, in accordance with certain embodiments of the present disclosure.

FIG. 5 is a flowchart 500 illustrating a methodology for remote attestation over a secure out-of-band network channel, from the remote administration server's perspective, in accordance with certain embodiments of the present disclosure. The attestation process provides a method for authenticating and attesting to the state of the computer platform and operating system, for example to validate integrity.

In some embodiments, a valid bitstream for downloading RTL modules of the MFC 140 may be detected at boot time by a trusted measurement process in the UEFI BIOS 324 that computes a hash of the bitstream at system boot. The attestation process may then compare this computed hash value to a trusted reference value stored in secure storage to determine if an attempt has been made to download a compromised bit stream. In some embodiments, an OS might require a secure boot operation to succeed before permitting the OS to boot. Alternatively, a boot manager/loader/executive may take management actions to re-program the FMC with a known good FMC bitstream and additional security actions may be taken to, for example, search forensic data for evidence of an attack or to notify systems administrators.

If FMC operation is supported, as determined at operation 502, then the remote administration server performs remote attestation in coordination with the platform management controller, using provisioned credentials, at operation 504. It the attestation does not result in a successful verification at operation 506, then, at operation 508, the remote administration server enforces configured policy actions. Otherwise, at operation 510, the remote administration server requests geo-fence, memory configuration, and guest OS requirements from the platform management controller. Next, at operation 512, the remote administration server provisions policies for dynamic memory management for hot-adds, memory training, and memory encryption. At operation 514, the configuration is recorded and the platform is allowed to operate with the configured policies.

Figure 6:
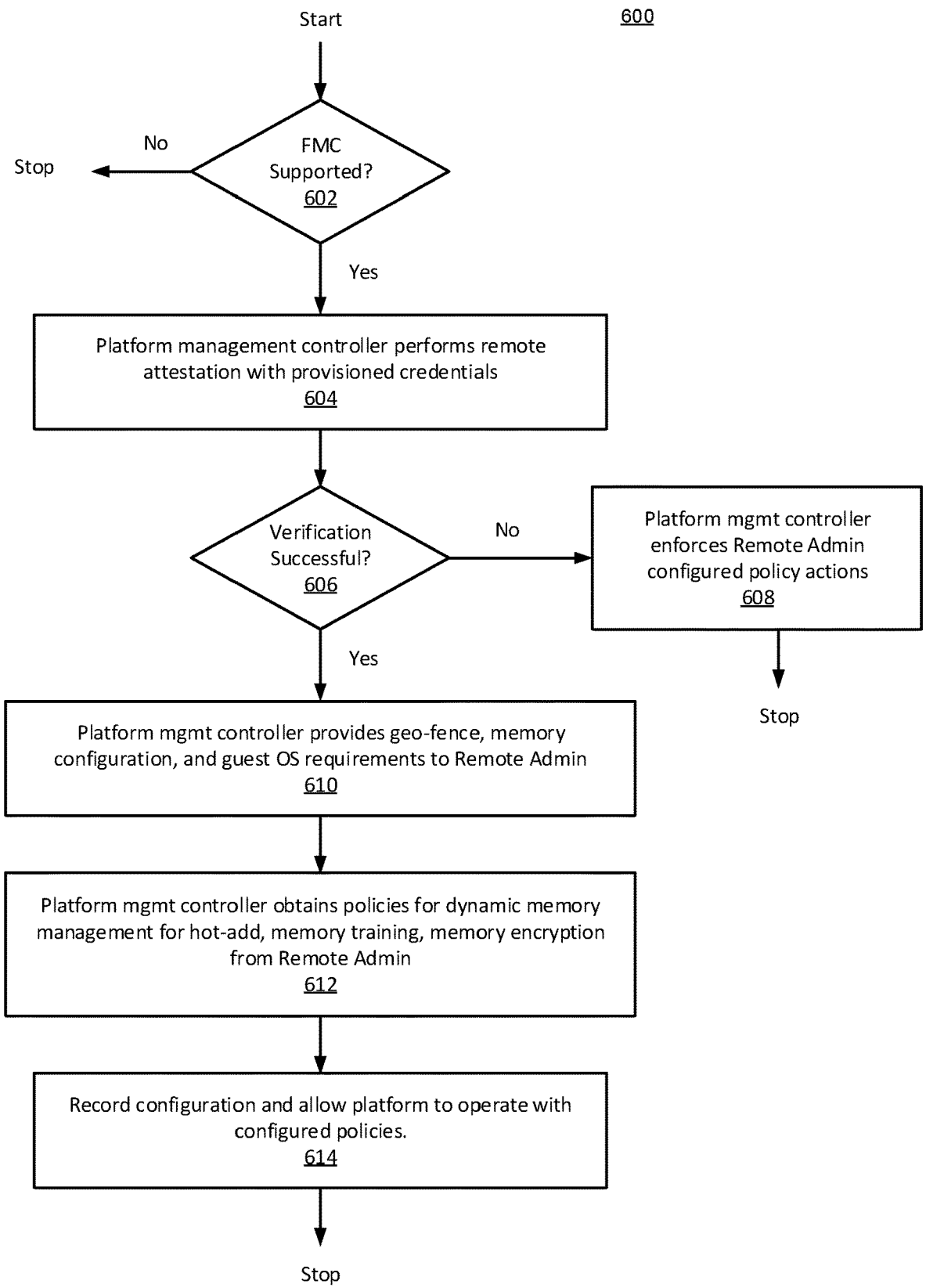
FIG. 6 is a flowchart illustrating another methodology for remote attestation over a secure out-of-band network channel, in accordance with certain embodiments of the present disclosure.

FIG. 6 is a flowchart 600 illustrating another methodology for remote attestation over a secure out-of-band network channel, from the platform management controller's perspective, in accordance with certain embodiments of the present disclosure.

If FMC operation is supported, as determined at operation 602, then the platform management controller performs remote attestation using provisioned credentials, at operation 604. It the attestation does not result in a successful verification at operation 606, then, at operation 608, the platform management controller enforces remote administration server configured policy actions. Otherwise, at operation 610, the platform management controller provides geo-fence, memory configuration, and guest OS requirements to the remote administration server. Next, at operation 612, the platform management controller obtains policies for dynamic memory management for hot-adds, memory training, and memory encryption from the remote administration server. At operation 614, the configuration is recorded and the platform is allowed to operate with the configured policies.

The coordination between the platform's management controller and the remote administration server enable allows for cooperative tailoring of memory hot-add operations to specific guest OS needs. For example, some memory modules can be overclocked and dedicated to high-performance guests, while other "normal" guests may access memory at relatively lower speeds.

Figure 7A:
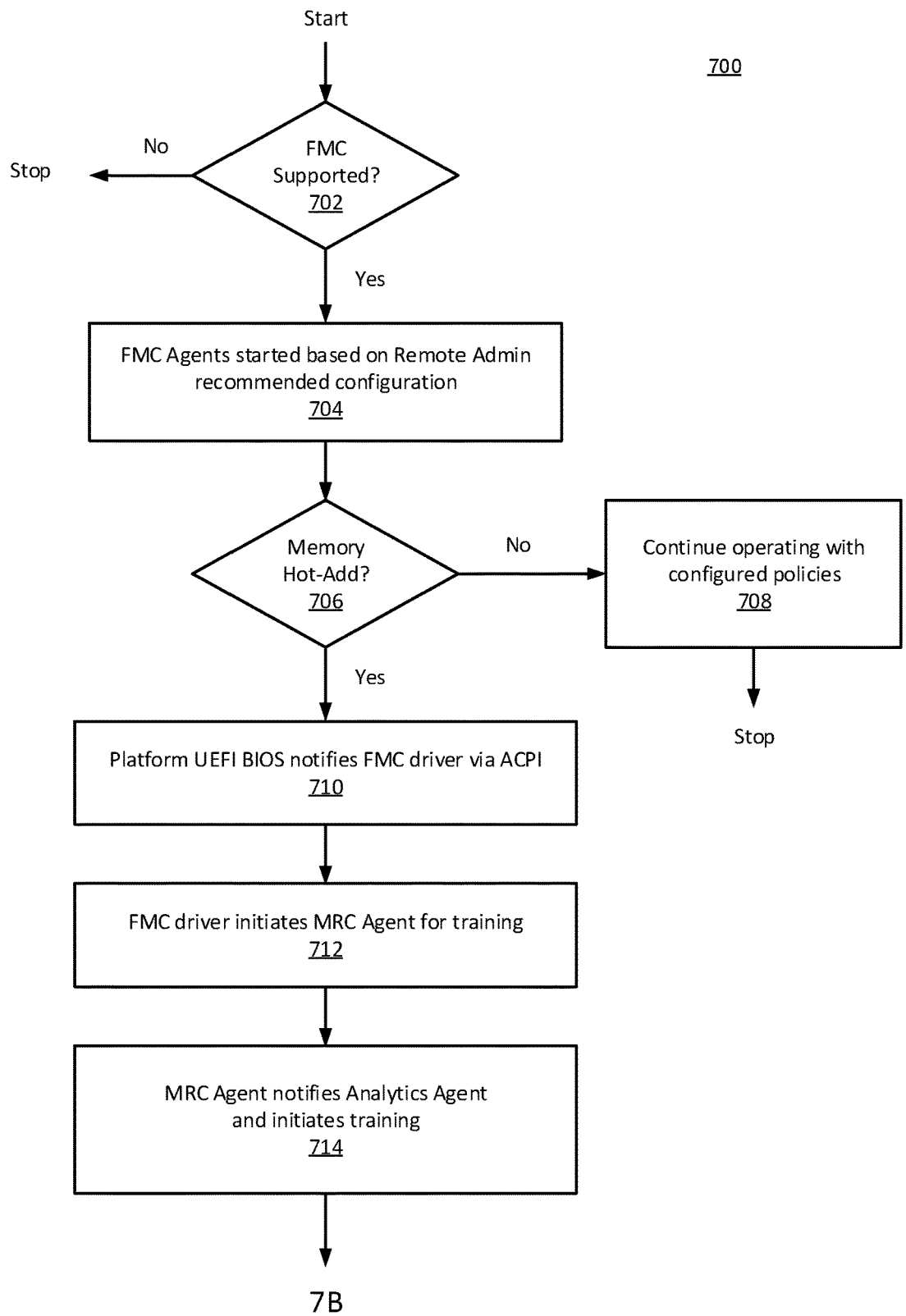
FIG. 7 (7A, 7B) are flowcharts illustrating a methodology for FPGA-based dynamic reconfiguration and management of memory, in accordance with certain embodiments of the present disclosure.

FIG. 7 (7A, 7B) are flowcharts 700 illustrating a methodology for FPGA-based dynamic reconfiguration and management of memory, in accordance with certain embodiments of the present disclosure. Beginning with FIG. 7A, if FMC operation is supported, as determined at operation 702, then the FMC RTL modules or agents are started, at operation 704, based on the remote administration server recommended configuration. If a memory hot-add is detected, at operation 706, then the platform UEFI BIOS notifies the FMC driver via ACPI, at operation 710, otherwise the platform continues operating with configured policies (operation 708). Next, at operation 712 the FMC driver initiates the MRC agent so that training of the hot-add memory module can begin. At operation 714, the MRC agent notifies the analytics agent and initiates training.

Figure 7B:
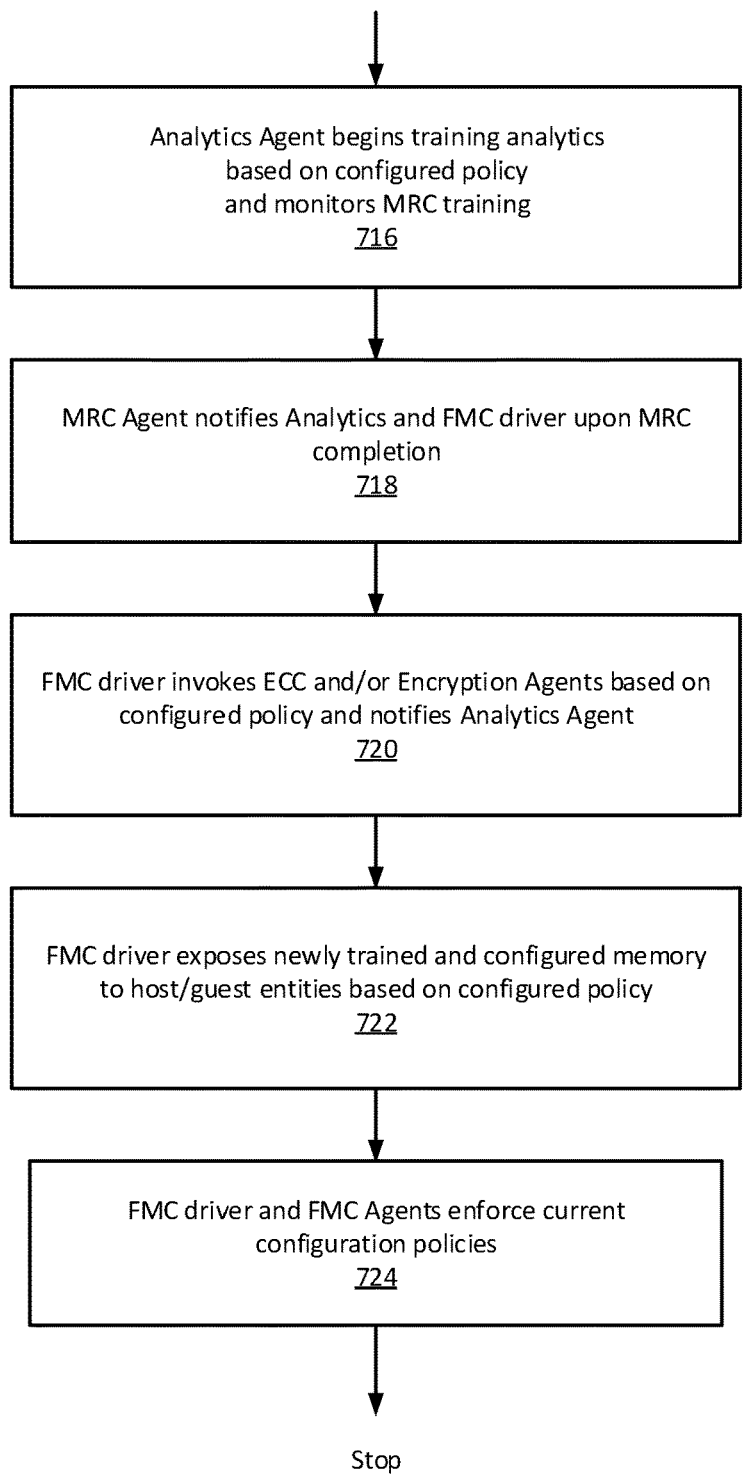

Continuing with FIG. 7B, at operation 716, the analytics agent begins training analytics based on the configured policy and monitors MRC training. Based on analysis of available memory bandwidth for the current workload, the MRC training may be throttled or overclocked. At operation 718, the MRC agent notifies the analytics agent and the FMC driver upon MRC completion. Next, at operation 720, the FMC driver invokes the ECC agent, the encryption agent, and/or other desired agents, based on the configured policy, and notifies the analytics agent.

At operation 722, the FMC driver exposes the newly trained and configured memory module to host/guest entities, based on the configured policy. At operation 724, the FMC driver and the FMC agents enforce the current configuration policies.

Figure 8:
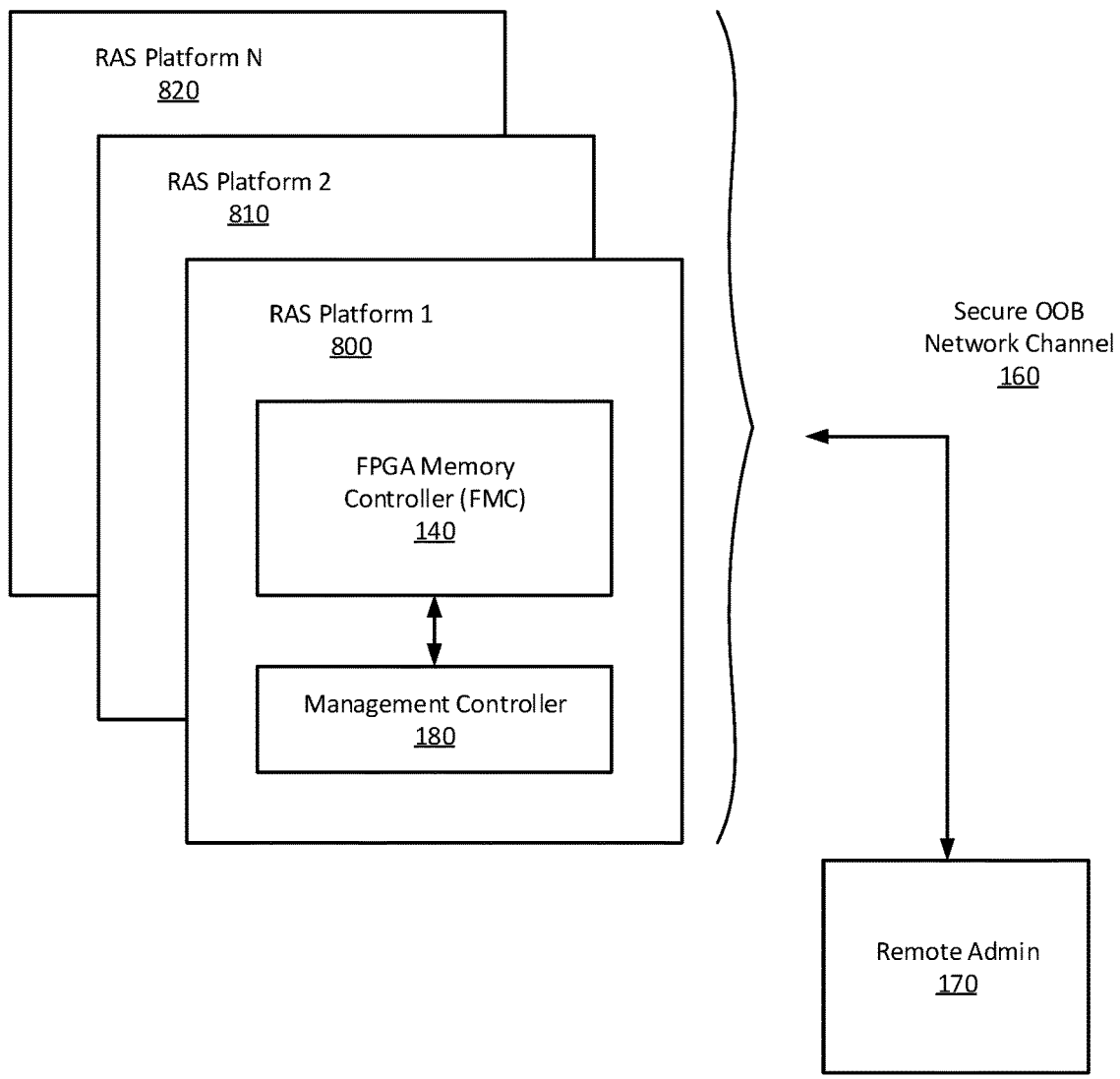
FIG. 8 is a block diagram illustrating communication between a remote administration server and Reliability-Availability-Serviceability (RAS) platforms over a secure out-of-band network channel, in accordance with certain embodiments of the present disclosure.

FIG. 8 is a block diagram 800 illustrating communication between a remote administration server and a number of Reliability-Availability-Serviceability (RAS) platforms over a secure out-of-band network channel, in accordance with certain embodiments of the present disclosure. The disclosed techniques provide for cloud based scalability of MRC content analytics with improved efficiency, and FPGA RTL bit stream tuning. Cloud-based remote administration server 170 can correlate the workload distribution of many data centers (RAS platforms 800, 810, 820) in terms of specific guest OS needs for memory hot-add with crowd-sourced analytics data. These correlations can be used for dynamic calibration or fine-tuning of the FMC RTL modules to meet required/desired performance levels. Said differently, the remote administration server can aggregate alerts and MRC analytics from a number of RAS systems, and provision RTL bit streams to dynamically manage the modules within the FMC in a secure manner via the OOB channel.

Methodology

Figure 9:
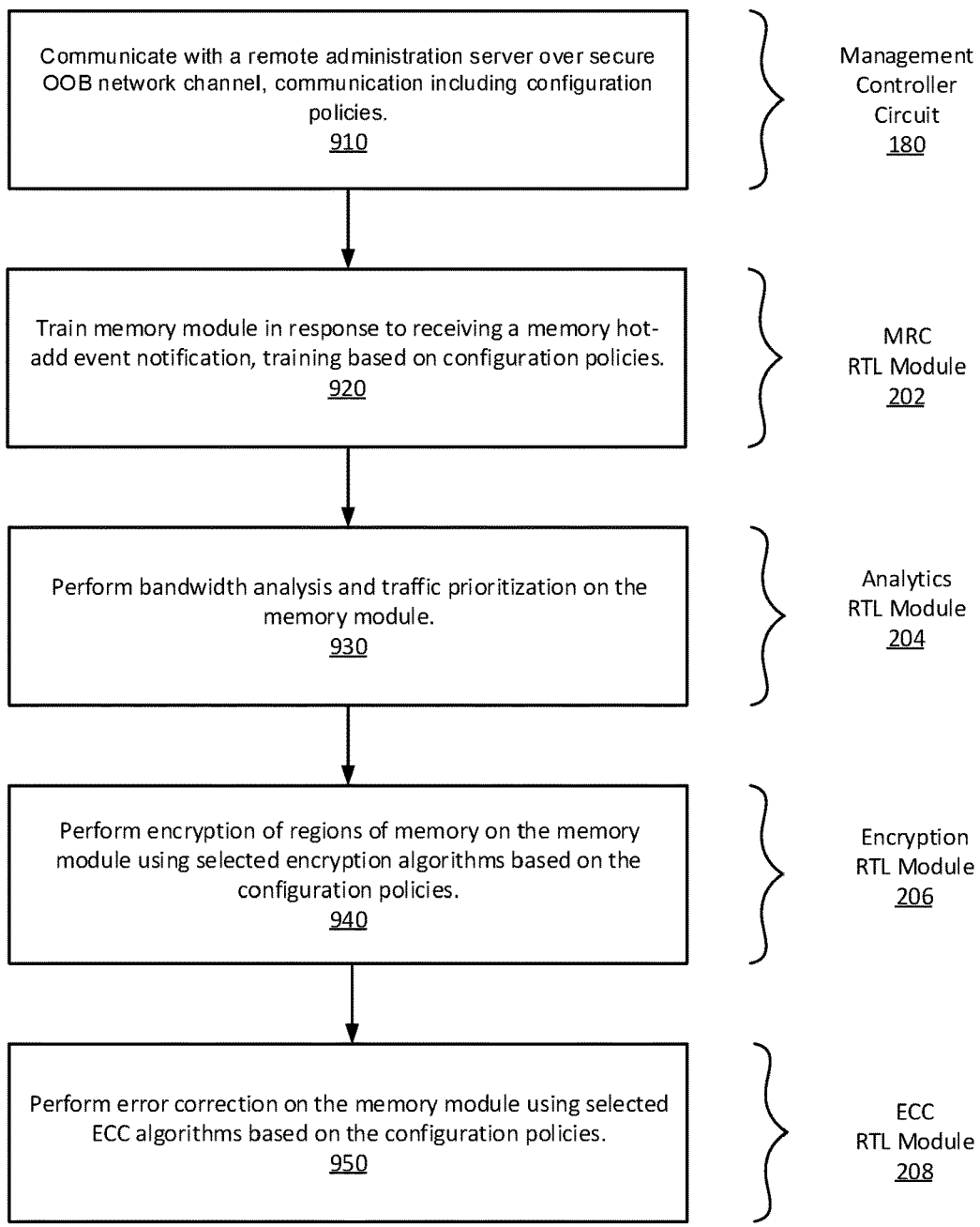
FIG. 9 is a flowchart illustrating another methodology for FPGA-based dynamic reconfiguration and management of memory, in accordance with certain embodiments of the present disclosure.

FIG. 9 is a flowchart illustrating an example method 900 for FPGA-based dynamic reconfiguration and management of memory, in accordance with certain embodiments of the present disclosure. As can be seen, the example method includes a number of phases and sub-processes, the sequence of which may vary from one embodiment to another. However, when considered in the aggregate, these phases and sub-processes form a process for memory management in accordance with certain of the embodiments disclosed herein. These embodiments can be implemented, for example using the system architecture illustrated in FIGS. 1-4, as described above. However other system architectures can be used in other embodiments, as will be apparent in light of this disclosure. To this end, the correlation of the various functions shown in FIG. 9 to the specific components illustrated in the other figures is not intended to imply any structural and/or use limitations. Rather, other embodiments may include, for example, varying degrees of integration wherein multiple functionalities are effectively performed by one system. For example, in an alternative embodiment a single module having decoupled sub-modules can be used to perform all of the functions of method 900. Thus, other embodiments may have fewer or more modules and/or sub-modules depending on the granularity of implementation. In still other embodiments, the methodology depicted can be implemented as a computer program product including one or more non-transitory machine readable mediums that when executed by one or more processors cause the methodology to be carried out. Numerous variations and alternative configurations will be apparent in light of this disclosure.

As illustrated in FIG. 9, in an embodiment, method 900 for FPGA-based memory management commences by communicating, at operation 910, with a remote administration server over a secure out-of-band (OOB) network channel. The communication includes configuration policies for the platform and for the memory to be managed. In some embodiments, the configuration policies may include boot prevention policies, alert generation policies, geo-fencing policies, threat models, optimization policies for hot-add versus host access, encryption policies, and/or error correction policies. Alert generation policies may provide for the type of alerts that can be generated, which in some embodiments may include one or more of the following: hot swappable memory configuration change detection; memory encryption enabled/disabled; memory training started/stopped/completed/invalidated; memory hot-add detected outside approved geo-location; memory access profile detection of anomalistic behavior (e.g., possible memory attack in progress); attestation status and in/out of trust policy (e.g., FMC contains a valid bitstream as defined by cryptographic hash policy); detection of an ECC violation on an attached memory storage subsystem; and detection of an encryption or decryption failure occurrence on an attached memory storage subsystem.

Next, at operation 920, a memory module is trained in response to receiving a memory hot-add event notification associated with the module. The training is performed by a Memory Reference Code (MRC) Register Transfer Level (RTL) module of the FPGA memory controller circuit (FMC circuit), and is based on the configuration policies. In some embodiments, the training includes adjustment of memory read timing and write timing based on the configuration policies.

At operation 930, an analytics RTL module of the FPGA performs bandwidth analysis and memory traffic prioritization of the memory module to determine adjustments to the clocking speed of the MRC training. For example, the MRC training may be either throttled down or overclocked to higher speeds, to prioritize either host access or training time. In some embodiments, analysis results from the analytics RTL module may be uploaded to the remote administration server, to be used for updating of the configuration policies.

At operation 940, an encryption RTL module of the FPGA performs encryption of regions of memory on the memory module using selected encryption processes based on the configuration policies. At operation 950, an ECC RTL module of the FPGA performs error correction on the memory module using selected ECC processes based on the configuration policies.

Of course, in some embodiments, additional operations may be performed, as previously described in connection with the system. For example, the FMC circuit exposes the trained and configured memory to host entities of the platform, through platform FMC driver software. The host entities may include a virtual machine manager (VMM), a host operating system (OS), and one or more guest OSs.

In some embodiments, the RTL modules of the FMC circuit are downloaded from, and periodically updated (e.g., patched) by the remote administration server, over the secure OOB channel. Additionally, in some embodiments, a remote attestation of the platform may be performed between the FMC circuit and the remote administration server, over the secure OOB channel, using provisioned credentials.

Example System

Figure 10:
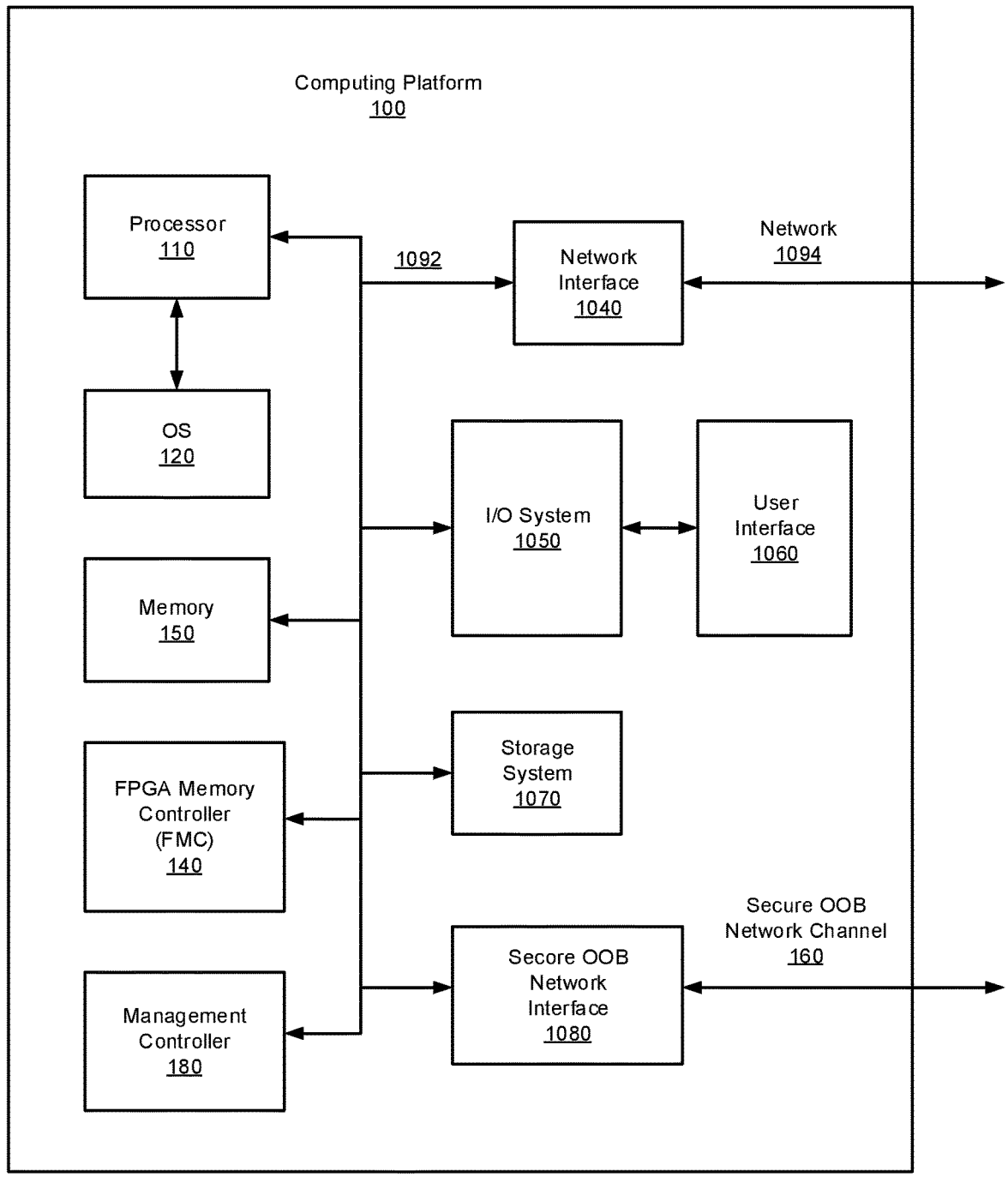
FIG. 10 is a block diagram schematically illustrating a computing system employing an FPGA memory controller, configured in accordance with certain embodiments of the present disclosure.

FIG. 10 illustrates an example computing system 1000 employing an FPGA memory controller 140, configured in accordance with certain embodiments of the present disclosure. In some embodiments, system 1000 comprises a computing platform 100 which may host, or otherwise be incorporated into a personal computer, workstation, server system, laptop computer, ultra-laptop computer, tablet, touchpad, portable computer, handheld computer, palmtop computer, smart device (for example, smartphone or smart tablet), data communication device, and so forth. Any combination of different devices may be used in certain embodiments.

In some embodiments, platform 100 may comprise any combination of a processor 110, a memory 150, FPGA memory controller (FMC) circuit 140, management controller circuit 180, a network interface 1040, an input/output (I/O) system 1050, a user interface 1060, a storage system 1070, and a secure out-of-band (OOB) network interface 1080. As can be further seen, a bus and/or interconnect 1092 is also provided to allow for communication between the various components listed above and/or other components not shown. Platform 100 can be coupled to a network 1094 through network interface 1040 to allow for communications with other computing devices, platforms, or resources. Management controller circuit 180 can be coupled to a remote administration server 170 over a secure OOB network channel 160 through secure OOB network interface 1080. Other componentry and functionality not reflected in the block diagram of FIG. 10 will be apparent in light of this disclosure, and it will be appreciated that other embodiments are not limited to any particular hardware configuration.

Processor 110 can be any suitable processor, and may include one or more coprocessors or controllers, such as a graphics processing unit, an audio processor, or hardware accelerator, to assist in control and processing operations associated with system 1000. In some embodiments, the processor 110 may be implemented as any number of processor cores. The processor (or processor cores) may be any type of processor, such as, for example, a microprocessor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 110 may be implemented as a complex instruction set computer (CISC) or a reduced instruction set computer (RISC) processor. In some embodiments, processor 110 may be configured as an x86 instruction set compatible processor.

Memory 150 can be implemented using any suitable type of digital storage including, for example, flash memory and/or random access memory (RAM). In some embodiments, the memory 150 may include various layers of memory hierarchy and/or memory caches as are known to those of skill in the art. Memory 150 may be implemented as a volatile memory device such as, but not limited to, a RAM, dynamic RAM (DRAM), or static RAM (SRAM) device. Memory 150 may be configured to allow for hot-add or hot-swap capability, as previously described. Storage system 1070 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 1070 may comprise technology to increase the storage performance enhanced protection for valuable digital media when multiple hard drives are included.

Processor 110 may be configured to execute an Operating System (OS) 1080 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), Linux, a real-time operating system (RTOS), or any variants thereof. As will be appreciated in light of this disclosure, the techniques provided herein can be implemented without regard to the particular operating system provided in conjunction with system 1000, and therefore may also be implemented using any suitable existing or subsequently-developed platform.

Network interface circuit 1040 can be any appropriate network chip or chipset which allows for wired and/or wireless connection between other components of computer system 1000 and/or network 1094, thereby enabling system 1000 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks. Secure OOB Network interface circuit 1080 can be any appropriate network chip or chipset which allows for secured (e.g., isolated and/or encrypted) wired and/or wireless connection between the management controller circuit 180 and remote administration server 170 over secure OOB network channel 160.

I/O system 1050 may be configured to interface between various I/O devices and other components of computer system 1000. I/O devices may include, but not be limited to, a user interface 1060. User interface 1060 may include devices (not shown) such as a display element, touchpad, keyboard, mouse, microphone, and speaker, etc. I/O system 1050 may include a graphics subsystem configured to perform processing of images for rendering on a display element. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 110 or any chipset of platform 100.

It will be appreciated that in some embodiments, the various components of the system 1000 may be combined or integrated in a system-on-a-chip (SoC) architecture. In some embodiments, the components may be hardware components, firmware components, software components or any suitable combination of hardware, firmware or software.

FMC circuit 140 is configured to perform dynamic reconfiguration and management of platform memory, for example during memory module hot-add operations, as described previously. FMC circuit 140 may include any or all of the circuits/components illustrated in FIG. 2, including MRC RTL module 202, Analytics RTL module 204, Encryption RTL module 206, and ECC RTL module 208, as described above. Management controller circuit 180 is configured to communicate with a remote administration server over a secure out-of-band network channel, as described above, wherein the communication may include, for example, the configuration policies to be applied by the FMC circuit to the memory module. These components can be implemented or otherwise used in conjunction with a variety of suitable software and/or hardware that is coupled to or that otherwise forms a part of platform 100. These components can additionally or alternatively be implemented or otherwise used in conjunction with user I/O devices that are capable of providing information to, and receiving information and commands from, a user. In some cases, access to resources on a given network or computing system may require credentials such as usernames, passwords, and/or compliance with any other suitable security mechanism.

In various embodiments, system 1000 may be implemented as a wireless system, a wired system, or a combination of both. When implemented as a wireless system, system 1000 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 1000 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the memory management methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 1094. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments system 1000 may comprise additional, fewer, or alternative subcomponents as compared to those included in the example embodiment of FIG. 10.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform methods and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smart phones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a system to manage memory hot-add to a computing platform, the system comprising: a Field Programmable Gate Array (FPGA) memory controller circuit (FMC circuit) including a Memory Reference Code (MRC) Register Transfer Level (RTL) module to perform training of a memory module in response to receiving a memory hot-add event notification associated with the memory module, wherein the MRC training includes adjustment of memory read timing and write timing based on configuration policies; and a management controller circuit to communicate with a remote administration server over a secure out-of-band network channel, the communication including the configuration policies to be applied by the FMC circuit to the memory module.

Example 2 includes the subject matter of Example 1, wherein the FMC circuit further comprises an analytics RTL module to perform bandwidth analysis and traffic prioritization associated with the memory module to determine adjustments to a clocking speed of the MRC training.

Example 3 includes the subject matter of Examples 1 or 2, wherein the communication with the remote administration server further includes uploading results of the analytics RTL module to the remote administration server, wherein the configuration policies are updated based on the results.

Example 4 includes the subject matter of any of Examples 1-3, wherein the communication with the remote administration server further includes uploading results of the analytics RTL module to the remote administration server, and downloading updated RTL modules from the remote administration server, wherein the RTL modules are updated based on the results.

Example 5 includes the subject matter of any of Examples 1-4, wherein the FMC circuit further comprises an encryption RTL module to perform encryption of regions of memory on the memory module using selected encryption processes based on the configuration policies.

Example 6 includes the subject matter of any of Examples 1-5, wherein the FMC circuit further comprises an error correction code (ECC) RTL module to perform error correction on the memory module using selected ECC processes based on the configuration policies.

Example 7 includes the subject matter of any of Examples 1-6, wherein the configuration policies include at least one of boot prevention policies, alert generation policies, geo-fencing policies, threat models, and optimization for hot-add versus host access.

Example 8 includes the subject matter of any of Examples 1-7, wherein the FMC circuit is further to expose trained and configured memory to host entities of the platform, through platform FMC driver software, based on the configuration policies, the host entities including at least one of a virtual machine manager (VMM), a host operating system (OS), and a guest OS.

Example 9 includes the subject matter of any of Examples 1-8, wherein the management controller circuit is further to perform remote attestation with the remote administration server using provisioned credentials.

Example 10 is a method for managing memory hot-add to a computing platform, the method comprising: training of a memory module, by a Memory Reference Code (MRC) Register Transfer Level (RTL) module of a Field Programmable Gate Array (FPGA) memory controller circuit (FMC circuit), in response to receiving a memory hot-add event notification associated with the memory module, wherein the training includes adjusting of memory read timing and write timing based on configuration policies; and communicating, by a management controller circuit, with a remote administration server over a secure out-of-band network channel, the communicating including transmission of the configuration policies to be applied by the FMC circuit to the memory module.

Example 11 includes the subject matter of Example 10, further comprising performing, by an analytics RTL module of the FMC circuit, bandwidth analysis and traffic prioritization associated with the memory module to determine adjustments to a clocking speed of the MRC training.

Example 12 includes the subject matter of Examples 10 or 11, wherein the communicating with the remote administration server further includes uploading results of the analytics RTL module to the remote administration server, wherein the configuration policies are updated based on the results.

Example 13 includes the subject matter of any of Examples 10-12, wherein the communication with the remote administration server further includes uploading results of the analytics RTL module to the remote administration server, and downloading updated RTL modules from the remote administration server, wherein the RTL modules are updated based on the results.

Example 14 includes the subject matter of any of Examples 10-13, further comprising performing, by an encryption RTL module of the FMC circuit, encryption of regions of memory on the memory module using selected encryption processes based on the configuration policies.

Example 15 includes the subject matter of any of Examples 10-14, further comprising performing, by an error correction code (ECC) RTL module of the FMC circuit, error correction on the memory module using selected ECC processes based on the configuration policies.

Example 16 includes the subject matter of any of Examples 10-15, wherein the configuration policies include at least one of boot prevention policies, alert generation policies, geo-fencing policies, threat models, and optimization for hot-add versus host access.

Example 17 includes the subject matter of any of Examples 10-16, further comprising exposing, by the FMC circuit, trained and configured memory to host entities of the platform, through platform FMC driver software, based on the configuration policies, the host entities including at least one of a virtual machine manager (VMM), a host operating system (OS), and a guest OS.

Example 18 includes the subject matter of any of Examples 10-17, further comprising performing, by the management controller circuit, remote attestation with the remote administration server using provisioned credentials.

Example 19 is at least one non-transitory computer readable storage medium having instructions encoded thereon that, when executed by one or more processors, result in operations for managing memory hot-add to a computing platform, the operations comprising: performing Memory Reference Code (MRC) training of a memory module in response to receiving a memory hot-add event notification associated with the memory module, wherein the training includes adjusting of memory read timing and write timing based on configuration policies; and communicating with a remote administration server over a secure out-of-band network channel, the communicating including transmission of the configuration policies to be applied to the memory module.

Example 20 includes the subject matter of Example 19, further comprising an operation of performing bandwidth analysis and traffic prioritization associated with the memory module to determine adjustments to a clocking speed of the MRC training.

Example 21 includes the subject matter of Examples 19 or 20, wherein the communicating with the remote administration server further includes an operation of uploading results of the bandwidth analysis and traffic prioritization to the remote administration server, wherein the configuration policies are updated based on the results.

Example 22 includes the subject matter of any of Examples 19-21, further comprising an operation of encrypting regions of memory on the memory module using selected encryption processes based on the configuration policies.

Example 23 includes the subject matter of any of Examples 19-22, further comprising an operation of performing error correction on the memory module using selected ECC processes based on the configuration policies.

Example 24 includes the subject matter of any of Examples 19-23, wherein the configuration policies include at least one of boot prevention policies, alert generation policies, geo-fencing policies, threat models, and optimization for hot-add versus host access.

Example 25 includes the subject matter of any of Examples 19-24, further comprising an operation of exposing trained and configured memory to host entities of the platform, through platform FMC driver software, the host entities including at least one of a virtual machine manager (VMM), a host operating system (OS), and a guest OS.

Example 26 includes the subject matter of any of Examples 19-25, further comprising an operation of performing remote attestation with the remote administration server using provisioned credentials.

Example 27 is a system for managing memory hot-add to a computing platform, the system comprising: means for training of a memory module, by a Memory Reference Code (MRC) Register Transfer Level (RTL) module of a Field Programmable Gate Array (FPGA) memory controller circuit (FMC circuit), in response to receiving a memory hot-add event notification associated with the memory module, wherein the training includes adjusting of memory read timing and write timing based on configuration policies; and means for communicating, by a management controller circuit, with a remote administration server over a secure out-of-band network channel, the communicating including transmission of the configuration policies to be applied by the FMC circuit to the memory module.

Example 28 includes the subject matter of Example 27, further comprising means for performing, by an analytics RTL module of the FMC circuit, bandwidth analysis and traffic prioritization associated with the memory module to determine adjustments to a clocking speed of the MRC training.

Example 29 includes the subject matter of Examples 27 or 28, wherein the communicating with the remote administration server further includes uploading results of the analytics RTL module to the remote administration server, wherein the configuration policies are updated based on the results.

Example 30 includes the subject matter of any of Examples 27-29, wherein the communication with the remote administration server further includes uploading results of the analytics RTL module to the remote administration server, and downloading updated RTL modules from the remote administration server, wherein the RTL modules are updated based on the results.

Example 31 includes the subject matter of any of Examples 27-30, further comprising means for performing, by an encryption RTL module of the FMC circuit, encryption of regions of memory on the memory module using selected encryption processes based on the configuration policies.

Example 32 includes the subject matter of any of Examples 27-31, further comprising means for performing, by an error correction code (ECC) RTL module of the FMC circuit, error correction on the memory module using selected ECC processes based on the configuration policies.

Example 33 includes the subject matter of any of Examples 27-32, wherein the configuration policies include at least one of boot prevention policies, alert generation policies, geo-fencing policies, threat models, and optimization for hot-add versus host access.

Example 34 includes the subject matter of any of Examples 27-33, further comprising means for exposing, by the FMC circuit, trained and configured memory to host entities of the platform, through platform FMC driver software, based on the configuration policies, the host entities including at least one of a virtual machine manager (VMM), a host operating system (OS), and a guest OS.

Example 35 includes the subject matter of any of Examples 27-34, further comprising means for performing, by the management controller circuit, remote attestation with the remote administration server using provisioned credentials.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A system to manage memory hot-add to a computing platform, the system comprising:
   a Field Programmable Gate Array (FPGA) memory controller circuit (FMC circuit) including a Memory Reference Code (MRC) Register Transfer Level (RTL) module to perform MRC training of a memory module in response to receiving a memory hot-add event notification associated with the memory module, wherein the MRC training includes adjustment of memory read timing and write timing based on configuration policies, through which improved read and write timing for hot-add versus host access is obtained for the memory module; and
   a management controller circuit to communicate with a remote administration server over a secure out-of-band network channel, the communication including the configuration policies to be applied by the FMC circuit to the memory module.

2. The system of claim 1, wherein the FMC circuit further comprises an analytics RTL module to perform bandwidth analysis and traffic prioritization associated with the memory module to determine adjustments to a clocking speed of the MRC training.

3. The system of claim 2, wherein the communication with the remote administration server further includes uploading results of the analytics RTL module to the remote administration server, wherein the configuration policies are updated based on the results.

4. The system of claim 2, wherein the communication with the remote administration server further includes uploading results of the analytics RTL module to the remote administration server, and downloading updated RTL modules from the remote administration server, wherein the RTL modules are updated based on the results.

5. The system of claim 1, wherein the FMC circuit further comprises an encryption RTL module to perform encryption of regions of memory on the memory module using selected encryption processes based on the configuration policies.

6. The system of claim 1, wherein the FMC circuit further comprises an error correction code (ECC) RTL module to perform error correction on the memory module using selected ECC processes based on the configuration policies.

7. The system of claim 1, wherein the configuration policies include at least one of boot prevention policies, alert generation policies, geo-fencing policies, threat models, and optimization for hot-add versus host access.

8. The system of claim 1, wherein the FMC circuit is further to expose trained and configured memory to host entities of the platform, through platform FMC driver software, based on the configuration policies, the host entities including at least one of a virtual machine manager (VMM), a host operating system (OS), and a guest OS.

9. The system of claim 1, wherein the management controller circuit is further to perform remote attestation with the remote administration server using provisioned credentials.

10. A method for managing memory hot-add to a computing platform, the method comprising:
training of a memory module, by a Memory Reference Code (MRC) Register Transfer Level (RTL) module of a Field Programmable Gate Array (FPGA) memory controller circuit (FMC circuit), in response to receiving a memory hot-add event notification associated with the memory module, wherein the MRC training includes adjusting of memory read timing and write timing based on configuration policies, through which improved read and write timing for hot-add versus host access is obtained for the memory module; and
communicating, by a management controller circuit, with a remote administration server over a secure out-of-band network channel, the communicating including transmission of the configuration policies to be applied by the FMC circuit to the memory module.

11. The method of claim 10, further comprising performing, by an analytics RTL module of the FMC circuit, bandwidth analysis and traffic prioritization associated with the memory module to determine adjustments to a clocking speed of the MRC training.

12. The method of claim 11, wherein the communicating with the remote administration server further includes uploading results of the analytics RTL module to the remote administration server, wherein the configuration policies are updated based on the results.

13. The method of claim 11, wherein the communication with the remote administration server further includes uploading results of the analytics RTL module to the remote administration server, and downloading updated RTL modules from the remote administration server, wherein the RTL modules are updated based on the results.

14. The method of claim 10, further comprising performing, by an encryption RTL module of the FMC circuit, encryption of regions of memory on the memory module using selected encryption processes based on the configuration policies.

15. The method of claim 10, further comprising performing, by an error correction code (ECC) RTL module of the FMC circuit, error correction on the memory module using selected ECC processes based on the configuration policies.

16. The method of claim 10, wherein the configuration policies include at least one of boot prevention policies, alert generation policies, geo-fencing policies, threat models, and optimization for hot-add versus host access.

17. The method of claim 10, further comprising exposing, by the FMC circuit, trained and configured memory to host entities of the platform, through platform FMC driver software, based on the configuration policies, the host entities including at least one of a virtual machine manager (VMM), a host operating system (OS), and a guest OS.

18. The method of claim 10, further comprising performing, by the management controller circuit, remote attestation with the remote administration server using provisioned credentials.

19. At least one non-transitory computer readable storage medium having instructions encoded thereon that, when executed by one or more processors, result in operations for managing memory hot-add to a computing platform, the operations comprising:
performing Memory Reference Code (MRC) training of a memory module in response to receiving a memory hot-add event notification associated with the memory module, wherein the MRC training includes adjusting of memory read timing and write timing based on configuration policies, through which improved read and write timing for hot-add versus host access is obtained for the memory module; and
communicating with a remote administration server over a secure out-of-band network channel, the communicating including transmission of the configuration policies to be applied to the memory module.

20. The non-transitory computer readable storage medium of claim 19, further comprising an operation of performing bandwidth analysis and traffic prioritization associated with the memory module to determine adjustments to a clocking speed of the MRC training.

21. The non-transitory computer readable storage medium of claim 20, wherein the communicating with the remote administration server further includes an operation of uploading results of the bandwidth analysis and traffic prioritization to the remote administration server, wherein the configuration policies are updated based on the results.

22. The non-transitory computer readable storage medium of claim 19, further comprising an operation of encrypting regions of memory on the memory module using selected encryption processes based on the configuration policies.

23. The non-transitory computer readable storage medium of claim 19, further comprising an operation of performing error correction on the memory module using selected ECC processes based on the configuration policies.

24. The non-transitory computer readable storage medium of claim 19, wherein the configuration policies include at least one of boot prevention policies, alert generation policies, geo-fencing policies, threat models, and optimization for hot-add versus host access.

25. The non-transitory computer readable storage medium of claim 19, further comprising an operation of exposing trained and configured memory to host entities of the platform, through platform FMC driver software, the host entities including at least one of a virtual machine manager (VMM), a host operating system (OS), and a guest OS.

* * * * *